(No Model.) 3 Sheets—Sheet 2.
H. CURZON.
MEANS FOR INTERCEPTING IMPURITIES CONTAINED IN RAIN WATER AND FILTERING THE SAME.
No. 356,192. Patented Jan. 18, 1887.
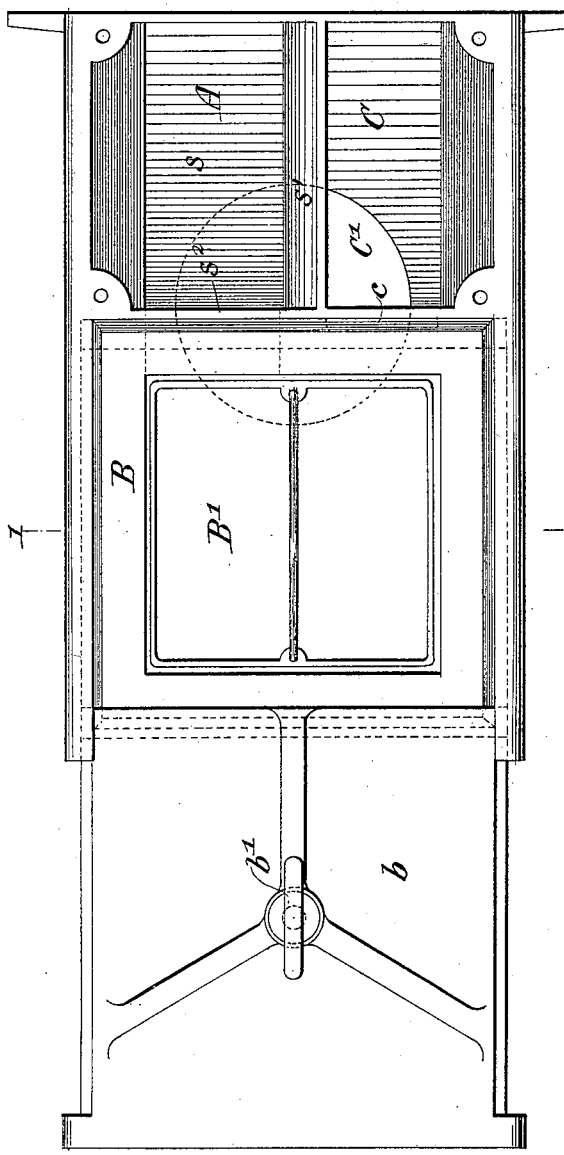
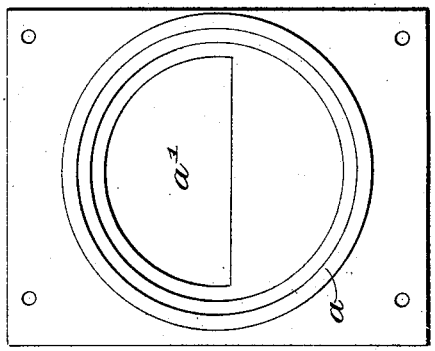
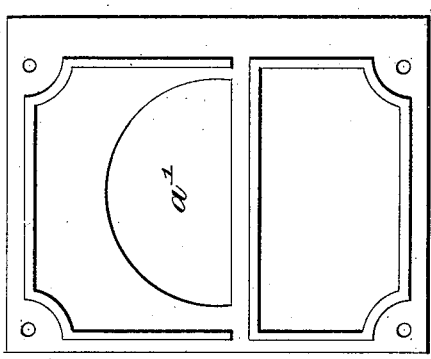
Witnesses.
Inventor.
Henry Curzon

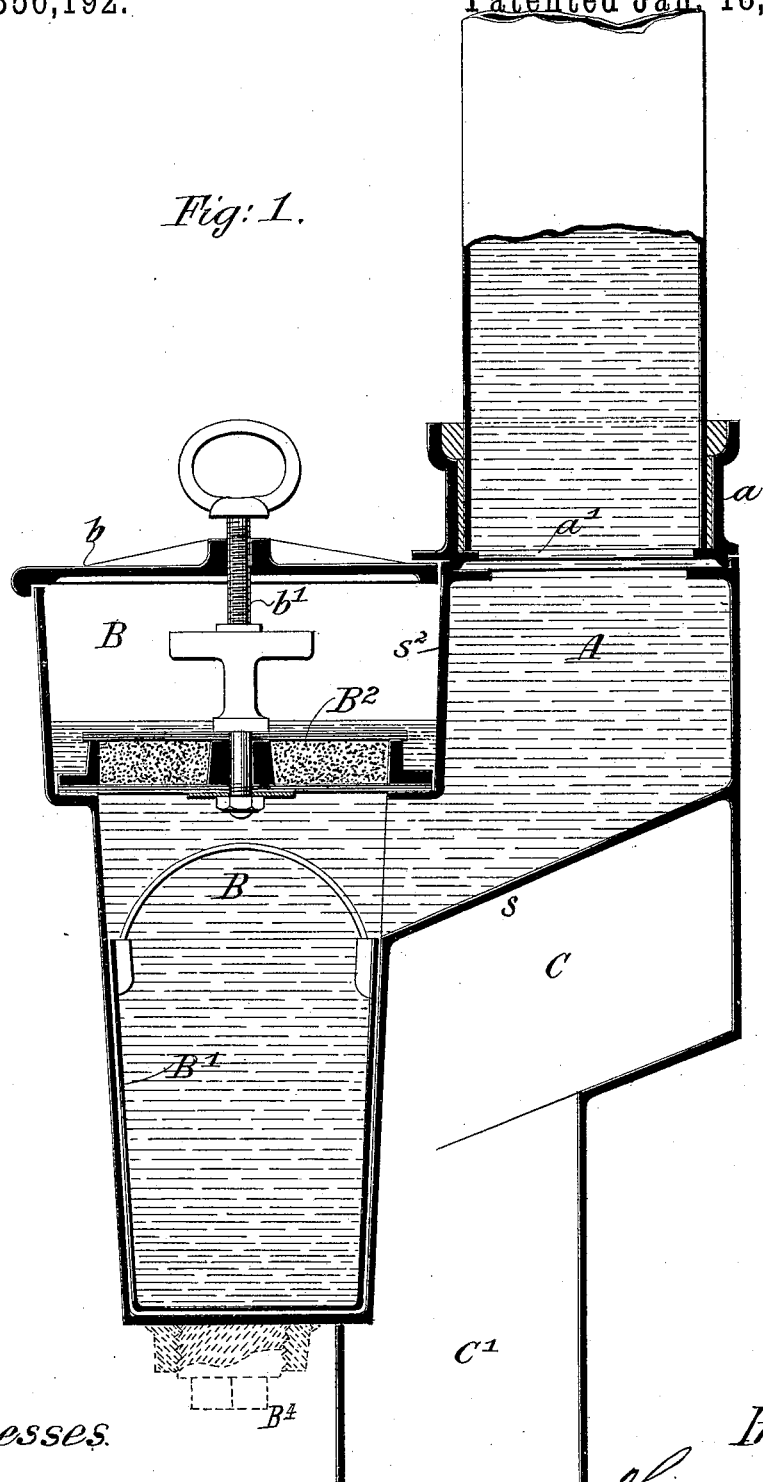

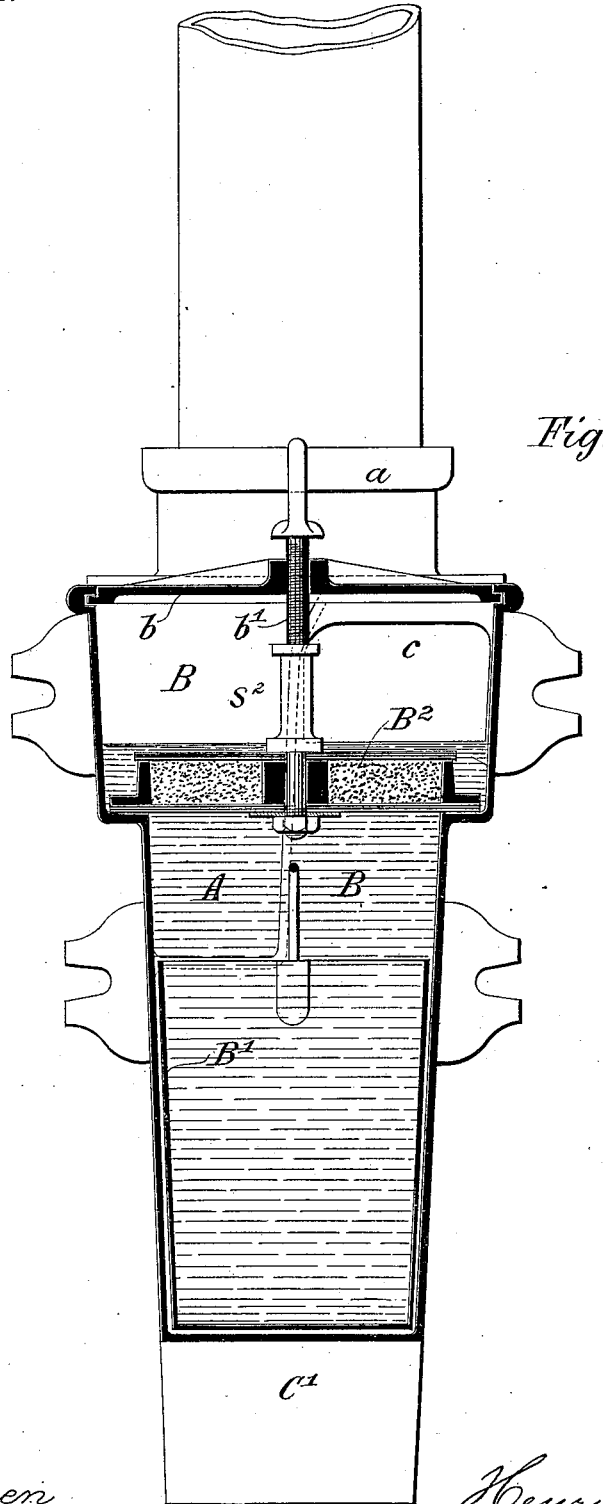

UNITED STATES PATENT OFFICE.

HENRY CURZON, OF LONDON, ENGLAND.

MEANS FOR INTERCEPTING IMPURITIES CONTAINED IN RAIN-WATER AND FILTERING THE SAME.

SPECIFICATION forming part of Letters Patent No. 356,192, dated January 18, 1887.

Application filed July 8, 1886. Serial No. 207,392. (No model.) Patented in England November 3, 1884, No. 14,521, and in Belgium September 17, 1885, No. 70,233.

*To all whom it may concern:*

Be it known that I, HENRY CURZON, of 61 Lincoln's Inn Fields, London, England, have invented certain new and Improved Means for Intercepting Impurities Contained in Rain-Water and Filtering the same on its way from Roofs to Tanks or other Receptacles, of which the following is a specification.

The present invention relates to improved means for intercepting and removing the impurities from rain-water during its passage from roofs to tanks or other receptacles, the objects in view being to enable the intercepting and filtering vessels or media to be readily removed and replaced after cleansing or renewal, and to accelerate the filtering operation.

The invention relates to that class of apparatus in which there is employed a filter-bed, having below it a well or receptacle into which leaves and other impurities received with the rain-water are deposited, and from above which the purified or filtered water flows to the point of final delivery.

The object of my invention is to provide an apparatus of simple construction in which the parts are arranged within a shell or casing, which may be made of cast metal and placed in the line of a rain-water pipe; and the invention consists in novel features of construction and combinations of parts which are hereinafter described, and pointed out in the claims.

The invention is illustrated in the accompanying drawings, in which Figure 1 is a vertical section of my improved intercepting and filtering apparatus combined in a water-tight manner with the lower end of a rain-water pipe. Fig. 2 is a plan of the casting or vessel in which are placed the intercepting and filtering receptacles or media. Fig. 3 is a section on the line 1 2 of Fig. 2. Fig. 4 is a plan view of the pipe-socket and top plate removed; and Fig. 5 is an inverted plan view of the top-plate.

The filtering apparatus, which may be of metal or earthenware molded or cast to the required shape, consists of three chambers, A, B, and C. Its upper part is of rectangular form, the chamber A terminating in a socket, $a$, to receive the end of the rain-water pipe, to which it is connected in a water-tight manner.

B is the filtering-chamber, provided with a sliding lid or cover, $b$. This chamber B projects below the level of the inlet-chamber A, and forms a sunk receptacle or well adapted to receive a bucket or catch-box, B', of corresponding form, fitted with a handle by which it may be readily removed or replaced. This well, whether circular or rectangular in cross-section, I prefer to make to taper downward, so that the catch-box of corresponding form will the more readily drop and fit into its place.

The object of the catch-box is to collect the leaves and coarser impurities entering the apparatus by the chamber A, and prevent their clogging the surface of the filtering or straining bed or pad $B^2$, which is fixed across the chamber B, as shown in the drawings, and is held firmly in place by the pressure-screw $b'$, which takes its bearing in the cover $b$.

The filtering material may consist of asbestus fiber or charcoal placed between two layers of fibrous material and clamped in a suitably-perforated metal frame; but I do not limit myself to the precise construction of the filtering and straining materials, nor to any particular filtering medium.

A lateral partition, $s$, here shown as inclined, extends partly across the shell or casing to form the bottom of the inlet-chamber A, and the two sides of the inlet-chamber A, which are not formed by the exterior walls of the shell or casing, are formed by the upright partition $s^2$ and the slightly-inclined but substantially upright partition $s'$. As shown in Fig. 2, the inlet-chamber A only extends about one-half the width of the shell or casing. In the partition $s^2$ and at the side of the inlet-chamber A is an opening, $c$, through which filtered water from the portion of the chamber B above the filter-bed flows down past and out of the side of the inlet-chamber A to the outlet-chamber C.

The rain-water entering at A deposits the coarser particles of foreign matter it contains within the removable catch-box B', rises upward through the straining and filtering substances $B^2$, and passes off by the overflow $c$ into the chamber C, which it will leave by the discharge-opening C' in a clear condition, and may flow into a tank or reservoir or drain leading thereto. When it is required to remove the intercepted impurities and to cleanse or renew the filtering medium, it is only necessary to loosen the screw $b'$ and remove the cover $b$, when free access can be had to the filtering-diaphragm and the catch-box $B'$.

An advantage of the above-described combination and arrangement of parts is that while a moderate flow of rain-water passes easily through the filter a large volume of water from the roof—such as will be brought down during a storm—will accumulate in the downpipe and accelerate the speed of filtration proportionately to the head of water in the said pipe.

In practice I make the socket $a$ in one with a detachable top plate which overlies the chambers A and C, and completely closes in the chamber C at top. This plate has in it an opening, $a'$, over the chamber A, so that the rain-water from the pipe can freely enter that chamber.

From the plan view of the top plate and socket, Fig. 4, it will be seen that a flange is left around the orifice $a'$, so that the end of the rain-water pipe can rest evenly in place, and a good hold is obtained for the water-tight packing between the pipe end and the wall of the socket $a$. This top plate (as will be seen from the inverted plan view in Fig. 5) has ribs or flanges cast on its lower side corresponding to the position of the upper edges of the walls and partitions of the chambers A and C, which it covers in, for the purpose of affording a secure hold for a packing of red lead, cement, or its equivalent. By making this top plate and socket in one piece and detachable I simplify the construction and increase the utility of the apparatus, as by constructing a series of top plates of uniform size, but with sockets of varying diameters and shapes, I can readily adapt my improved apparatus to any usual kind of rain-water pipe by simply changing the top plate and socket, and without in any way altering the rest of the apparatus. I secure the top plate and socket in place by means of screws.

The rain-water pipe may be of one length, or of several lengths united together by water-tight joints, an important feature of my invention being that there shall be no escape for the water in the said pipe, or united lengths of pipe, except through the filtering apparatus. A gargoyle or spout at the top of the length of downpipe may be provided to act as an overflow during abnormal rain-fall.

Instead of fitting the sunk portion or well of the chamber B with a removable bucket, a draw-off plug might be fitted thereto to remove the collected sediment, as shown by dotted lines at $B^4$, Fig. 1; but I prefer to employ a bucket or catch-box, as described, and to make it of tapering form, so as to be more readily dropped into place or removed, and fit it with a handle, as shown.

Rain-water-filtering apparatus constructed and arranged as herein above described can be readily inspected and quickly cleaned, while, by introducing the water-tight connection I obtain an increased pressure when necessary, and thus am able to make the filtering apparatus small and unobtrusive in appearance.

I take as a standard for a length of rain-water pipe, as hereinbefore referred to, six lineal feet, as commonly made; but for expedience, to suit certain positions, this length may be reduced or increased, and in addition other lengths may be joined thereto, always, however, in a water-tight manner.

I would here remark that I do not confine myself to any particular shape, size, or proportion for the several parts of the apparatus so long as their relative positions and functions are preserved.

Having now particularly described the nature of my invention and in what manner the same is to be performed, I declare that what I claim is—

1. The combination, with an inlet-pipe and an outlet-pipe, of a shell or casing constructed with a filtering-chamber, B, and the outlet-chamber C at the side thereof, a removable filter-bed, $B^2$, in the chamber B, the lateral and substantially upright partitions $s$ $s'$ $s^2$, forming the inlet passage or chamber A, leading to the filter-chamber B below said bed, and an overflow opening or passage, $c$, in the partition $s^2$, leading from the top of the filter-chamber above said bed and downward past the inlet-passage A to the outlet-passage C, all substantially as herein described.

2. The combination, with the inlet-pipe and an outlet-pipe, of a shell or casing constructed with the filter-chamber B and the outlet-chamber C at the side thereof, a removable filter-bed, $B^2$, in the chamber B, and the removable bucket $B'$ in said filter-chamber, below the bed, the lateral and substantially upright partitions $s$ $s'$ $s^2$, forming an inlet chamber or passage, A, leading to the filter-chamber below the bed, and the overflow opening or passage $c$ in the partition $s^2$, leading from the top of the filter-chamber above the bed downward past the inlet-chamber A and to the outlet-passage C, all arranged substantially as herein described.

HENRY CURZON.

Witnesses:
 H. K. WHITE,
 G. H. G. MATHIESON.
*Both of 6 Bream's Building, London, E. C.*